(12) United States Patent
Shustef

(10) Patent No.: US 8,229,314 B2
(45) Date of Patent: Jul. 24, 2012

(54) SYSTEM AND METHOD FOR CONTROLLING ORDERING OF COLOR TONER BASED ON A SERVICE CONTRACT

(75) Inventor: Yevgeniy Shustef, Macedon, NY (US)

(73) Assignee: Xerox Corporation, Norwalk, CT (US)

( * ) Notice: Subject to any disclaimer, the term of this patent is extended or adjusted under 35 U.S.C. 154(b) by 534 days.

(21) Appl. No.: 12/415,046

(22) Filed: Mar. 31, 2009

(65) Prior Publication Data
US 2010/0247132 A1 Sep. 30, 2010

(51) Int. Cl.
G03G 15/00 (2006.01)
(52) U.S. Cl. ............... 399/79; 399/10; 399/27
(58) Field of Classification Search ............ 399/79, 399/11, 24, 27, 9, 10
See application file for complete search history.

(56) References Cited

U.S. PATENT DOCUMENTS

| 5,305,199 | A | * | 4/1994 | LoBiondo et al. | 399/24 X |
| 6,016,049 | A | | 1/2000 | Baughman et al. | |
| 6,940,613 | B1 | | 9/2005 | Beard et al. | |
| 7,650,085 | B2 | * | 1/2010 | Kehoe et al. | 399/10 X |
| 7,962,050 | B2 | * | 6/2011 | Shustef et al. | 399/79 X |

* cited by examiner

Primary Examiner — Sophia S Chen
(74) Attorney, Agent, or Firm — Fay Sharpe LLP

(57) ABSTRACT

A system and method for managing customer color orders associated with at least one printer device, including a processor and a supply control module including a series of programmable instructions executable by the processor for: receiving color usage data from the at least one printer device indicative of consumption of one or more of a plurality of color toners; calculating for each printer device of the at least one printer device a permissible amount of each color toner of the plurality of color toners that can be ordered for the printer device by a customer based on a contract; and receiving a customer color order request for selectively ordering an amount of one or more color toners of the plurality of color toners for a printer device of the at least one printer device under the contract.

23 Claims, 3 Drawing Sheets

SYSTEM AND METHOD FOR CONTROLLING ORDERING OF COLOR TONER BASED ON A SERVICE CONTRACT

BACKGROUND

1. Field of the Related Art

This disclosure relates to an approach for controlling the ordering of consumable supplies, and, more particularly, to a system and method for controlling supply ordering, such as the ordering of one or more color toners associated with one or more printing devices.

2. Description of the Related Art

In the printing industry it is common for printer manufacturers to sell or rent a printer together with a service contract. The service contract may include terms which specify that the customer is entitled to receive consumable printing supplies for their printing needs associated with the printer. Based on the service contract, the customer may place orders for the consumable supplies as they are needed.

As such, various business models support full inclusion of supply management for customers as a part of the overall contract. All supplies in such models are priced into a customer contract. However, in conventional systems, contract price does not adjust based on the amount of supplies ordered by customers. The issue with the traditional approach is that customers order unlimited amounts of supplies at no extra cost to them, thus reducing and at times eliminating profit margins of the company offering the printing solutions. This process is referred to as "supply leakage," and is a known issue for businesses that provide a multitude of printing solutions.

SUMMARY

In an embodiment of the present disclosure, a supply control system is presented for managing customer color orders associated with at least one printer device, the supply control system including a processor and a supply control module including a series of programmable instructions executable by the processor for: receiving color usage data from the at least one printer device indicative of consumption of one or more of a plurality of color toners; calculating for each printer device of the at least one printer device a permissible amount of each color toner of the plurality of color toners that can be ordered for the printer device by a customer based on a contract; and receiving a customer color order request for selectively ordering an amount of one or more color toners of the plurality of color toners for a printer device of the at least one printer device under the contract wherein the supply control module limits the requested customer color order which can be ordered when the requested amount exceeds a permissible amount calculated for each color toner of the plurality of color toners for the printer device.

In an embodiment of the present disclosure, a method is presented for managing customer color orders associated with at least one printer device, the method including receiving color usage data from the at least one printer device indicative of consumption of one or more of a plurality of color toners; calculating for each printer device of the at least one printer device a permissible amount of each color toner of the plurality of color toners that can be ordered for the printer device by a customer based on a contract; and receiving a customer color order request for selectively ordering an amount of one or more color toners of the plurality of color toners for a printer device of the at least one printer device under the contract wherein the supply control module limits the requested customer color order which can be ordered when the requested amount exceeds a permissible amount calculated for each color toner of the plurality of color toners for the printer device.

The present disclosure also provides a computer-readable medium which stores programmable instructions configured for being executed by at least one processor for performing the methods described herein according to the present disclosure. The computer-readable medium can include flash memory, CD-ROM, a hard drive, etc.

BRIEF DESCRIPTION OF THE DRAWINGS

Various embodiments of the present disclosure will be described herein below with reference to the figures wherein.

DETAILED DESCRIPTION OF THE PREFERRED EMBODIMENTS

Figure 1:
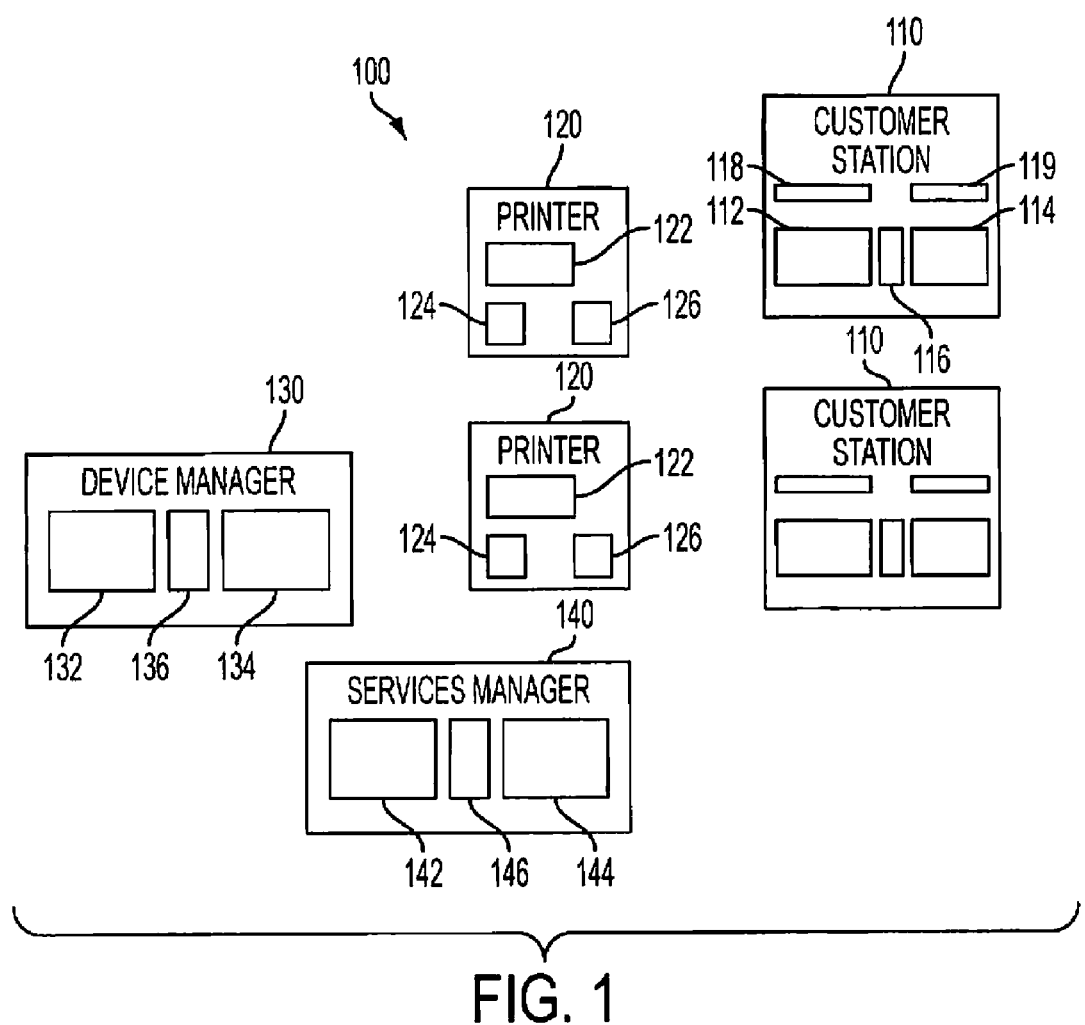
FIG. 1 is a block diagram of a supply control system for providing customer service for the ordering of one or more color toners, in accordance with the present disclosure.

Referring now to the drawing figures, in which like references numerals identify identical or corresponding elements, a system and method for controlling threshold level supply color orders based on a service contract in accordance with the present disclosure will now be described in detail.

The present disclosure proposes a threshold supply control model that applies to any CYM toner that has known rated life measured in impressions. This model is supported by usage (measured in impressions, broken down into black vs. color impressions) and coverage data (separate for red, cyan, magenta) collected from devices, such as MFDs, known toner yield and availability of historical data in a single repository, such that calculations can be performed for the various supply types in order to establish real customer needs. With this approach customers only receive supplies needed based on their usage patterns (measured in impressions, broken down into black vs. color impressions), therefore eliminating the supply leakage business problem and allowing for variable color orders.

The present disclosure further proposes enhancements to a validation algorithm, where customers are able to order more of the color they utilize the most and less of the unwanted colors, while maintaining their quota. The validation model of the present disclosure combines yield expectations and coverage levels together to provide an order limit that is not color specific, thus allowing customers to order any combination of colors based on the combined color limit. As a result, the present disclosure takes into account the fact that certain users utilize some colors more than others in their printing environments, thus allowing certain users to order their most used color in higher quantities than other colors and not forcing such customers to order unwanted colors.

Prior to describing the present disclosure in further detail, it will first be helpful to define various terms that will be used throughout the following discussion. For example:

The term "print" is overloaded to mean sending the document to the printer through any one of a multitude of ways. Moreover, the term "printer" can refer to any device that accepts text and graphic output from any type of computing device and transfers the information to any printable medium. A "printer" can refer to any type of xerographic, solid ink, liquid ink, cut sheet or web-based device used to print onto a wide array of printable media. The term "printer" as used herein encompasses any apparatus, such as a digital copier, bookmaking machine, facsimile machine, multi-function machine, etc. which performs a print outputting function for any purpose.

The term "module" refers to a self-contained component (unit or item) that is used in combination with other components and/or a separate and distinct unit of hardware or software that may be used as a component in a system, such as a printing system including a plurality of MFDs. The term "module" may also refer to a self-contained assembly of electronic components and circuitry, such as a stage in a computer that is installed as a unit.

The term "printer device" can refer to a multifunction device (MFD). The term "MFD" can refer to any machine that connects to either a computing device and/or network and performs one or more of the following functions: print, scan, copy, and/or fax. Digital copiers, fax machines, printers, and scanner combinations are all examples of MFDs. The term "MFD" can further refer to any hardware that combines several functions in one unit. For instance, an MFD can be a standalone printer or any type of standalone machine/device/apparatus/component. For example, an MFD can be one or more personal computers (PCs), a standalone printer, a standalone scanner, a mobile phone, an MP3 player, audio electronics, video electronics, GPS systems, televisions, recording and/or reproducing media (such as CDs, DVDs, camcorders, cameras, etc.) or any other type of consumer or non-consumer analog and/or digital electronics. Such consumer and/or non-consumer electronics can apply in any type of entertainment, communications, home, and/or office capacity. Thus, the term "MFDs" can refer to any type of electronics suitable for use with a circuit board and intended to be used by a plurality of individuals for a variety of purposes.

Embodiments will be described below while referencing the accompanying figures. The accompanying figures are merely examples and are not intended to limit the scope of the present disclosure.

With initial reference to FIG. 1, a block diagram of a supply control system is presented for providing customer service for the ordering of one or more color toners, in accordance with the present disclosure.

Supply control system 100 includes a customer station 110, a printer device 120, a device manager 130 and a services manager 140, each of which includes a respective processing device (including or accessing at least one storage device), a respective software module executable on the associated processing device and a respective communication device. The respective communication devices facilitate communication between the various processors, as described further below.

The printer device 120 may be purchased or rented from a product manufacturer or product dealer together with the purchase of a sales contract which includes terms for providing consumable supplies (color toners) associated with use of the printer device 120. The customer station 110 may be operated by an authorized operator or administrator associated with the customer. The administrator enters an order request for printer supplies (such as color toner) based on the service contract via the customer station 110. As described further below, the services manager 140 receives order requests from the customer station 110.

The services manager 140 further monitors supply usage by the printing device 120. As the printer is operated it records data about the color usage and transmits the data to the device manager 130. The services manager 140 receives the color usage data from the device manager 130, stores the color usage data for the printer and calculates the amount of color toner that the customer is entitled to order under the services contract based on the color usage data and the terms of the contract.

The services manager 140 executes an algorithm to determine the amount of supplies which the customer is entitled to order (Allowed_Supply). The algorithm uses the color usage data as well as the ink or toner cartridge yield, the type of printer device 120 used, previous ordering history and industry information to calculate Allowed_Supply. When an order request is received from the customer station 110, the services manager 140 determines if the customer is entitled to the supplies ordered and limits the amount of supplies which the customer is allowed to order based on Allowed_Supply. The algorithm may be adjusted to accommodate special customer needs upon customer request.

The supply control system 100 is now described in greater detail. The customer station 110 may be a computing device such as a computer workstation, a personal computer, a hand-held device, e.g., a personal digital assistant, etc. The customer station 110 is provided with a processor 112 and customer portal software module 114 executable on the processor 112 or accessible to the processor 112. The customer station 110 further includes at least one communication device 116 for exchanging information between the processor 112 and another processor, such as a processor of the services manager 140. The customer portal module 114 includes a series of programmable instructions capable of being executed or accessed by processor 112. The series of programmable instructions can be stored on a computer-readable medium, such as RAM, a hard drive, CD, smart card, 3.5" diskette, etc., or transmitted via propagated signals for being executed by the processor 112 for performing the functions disclosed herein and to achieve a technical effect in accordance with the disclosure. The customer portal module 114 may be stored by customer station 110 in non-volatile memory, such as a hard drive, or volatile memory, such as RAM. The customer portal module 114 may be installed at the time of manufacture, or by the user, such as by installing the software from a CD or by downloading or accessing the software from a website provided by the manufacturer of the printer device 120.

The customer station 110 includes a display device 119 (such as a computer monitor) and an input device 118 (such as keyboard, mouse, etc.). The customer portal module 114 generates a graphical user interface (GUI) displayable on the display device 119 for interacting with the administrator or user. The GUI provides a graphical interface, such as a form displayed on the display device 119, which the user uses to place an order request. The user can submit the order using the GUI. Upon submission of the order request, the order request information, Order_Request, is transmitted by the communication device 116 to the services manager 140.

The customer station 110 may be part of one or more networks, such as a LAN, WAN, intranet or the Intranet which facilitates communication between the customer station 110 and the services manager 140. The at least one communication device 116 provides communication between the processor 112 and the network. The at least one communication device 116 includes, for example, a modem, router and/or Ethernet port. For example, when a user of the customer station 110 accesses the manufacturer's website via the Internet, the processor 112 accesses the customer portal module 114 which provides the user with the GUI that the user uses to make and submit an order. Upon submitting an order, the Order_Request is transmitted to the services manager 140.

The printer device 120 includes a processor 122, a meter software module 124, and at least one communication device 126. The device may be any apparatus whose operation requires the use of at least one type of supply which must be replenished, such as based on the terms of a service contract. The consumable supplies include, for example, black or colored toner or lubricants. Toner includes a powder and/or liquid for marking a substrate, including, for example, ink, colorant, pigment, dye or a combination of one or more of ink, colorant, pigment or dye. The consumable supply is a material which is consumed by the apparatus. The consumable supply may be consumed through ordinary use of the apparatus. The rate of consumption can be measured and is predictable based on the degree of use of the apparatus. For example, where the apparatus is a printing device 120, the rate of consumption of color toner is predictable and measurable based on the number of impressions which are printed.

The meter module 124 includes a series of programmable instructions capable of being executed by processor 122. The series of programmable instructions can be stored on a computer-readable medium, such as RAM, a hard drive, CD, smart card, 3.5" diskette, etc., or transmitted via propagated signals for being executed by the processor 122 for performing the functions disclosed herein and to achieve a technical effect in accordance with the disclosure.

As the printer device 120 is operated to execute print jobs the information related to the jobs performed by the printer are recorded by the meter module 124. The data is stored by the processor 122 on a storage device (not shown) included with or accessed by the processor 122. For example, the meter module 124 records the number of impressions or pages that are printed. The meter module 124 may keep a running tally of the total number of pages printed and/or the number of pages printed since a most recent report was generated. The tally for large pages or impressions may be weighted to account for their size. For example, a large page may be tallied as two pages. It is envisioned that the meter module 124 may record additional information, such as the date that a new toner cartridge is installed, the type of toner cartridge installed, maintenance performed on the printer, etc. This information indicates the consumption of the toner by the printer device 120.

The meter module 124 transmits Printer_Usage data, including information stored by the meter module 124 that is related to the consumption of supplies by the printer device 120, via the communication device 126 to the device manager 130. The Printer_Usage data which is tracked and stored by the meter module 124 may be measured in impressions, which may be broken down, for example, into black vs. color impressions. The Printer_Usage data may also be measured by toner cartridge consumption based on tracking when toner cartridges are replaced. The transmission of the Printer_Usage data may be performed at intervals, such as at regular time intervals (e.g., once per week), at paper usage quota intervals (e.g., once per 1,000 pages printed), or at toner cartridge quota replacement intervals. On the other hand, the transmission of Printer_Usage data may be performed based on the occurrence of an event, such as a user request (where the request is user entered via a user entry device (not shown) at the printer device 120 or the device manager 130), a processor generated request (by the processor 122 or a processor of the device manager 130), a toner cartridge replacement, a maintenance tune-up, submission of an order request, etc.

The printer device 120 may be part of one or more networks, such as a LAN, WAN, intranet or the Internet which facilitates communication between the printer device 120 and the device manager 130. The at least one communication device 126 provides communication between the processor 122 and the network. The at least one communication device 126 includes, for example, a modem, router and/or Ethernet port. The printer device 120 receives printer job requests from one or more computers (which may or may not include the customer station 116) which are coupled to or networked (e.g., via a LAN, WAN or intranet) to the printer device 120.

The device manager 130 is a computing device including a processor 132, a device manager software module 132 and at least one communication device 136. The device manager module 134 receives Printer_Usage data from at least one printer devices 120. The Printer_Usage data includes an identifier, Printer ID, identifying the printer that transmitted the data, and usage data such as the total number of pages printed or the number of pages printed since the last report by transmission of Printer_Usage data.

The device manager module 134 forwards the Printer_Usage data to the Services Manager 140. The device manager module includes a series of programmable instructions capable of being executed by processor 132. The series of programmable instructions can be stored on a computer-readable medium, such as RAM, a hard drive, CD, smart card, 3.5" diskette, etc., or transmitted via propagated signals for being executed by the processor 132 for performing the functions disclosed herein and to achieve a technical effect in accordance with the disclosure.

The device manager 130 communicates with the printer device 120 and the services manager 140 via its communication device(s) 136. The device manager 130 may be part of one or more networks, such as a LAN, WAN, intranet or the Internet which facilitates communication between the device manager 130 and the services manager 140. Different networks may be used by the device manager 130 for communicating with the printer device(s) 120 and the services manager 140. The at least one communication device 136 provides communication between the processor 132 and the at least one network. The at least one communication device 136 includes, for example, a modem, router and/or Ethernet port.

The services manager 140 is a computing device which receives Order_Requests generated by at least one customer station 110 and Printer_Usage data from the device manager 130. The services manager includes a processor 142, a supply control software module 144 and at least one communication device 146. The supply control module 144 performs calculations on the Printer_Usage data received for determining an Allowed_Supply quantity for the printer associated with the Printer_Usage data. When the services manager 140 receives an Order_Request from a customer station 110, the supply control module 144 processes the Order_Request, which includes limiting the amount of supplies which can be ordered by the Order_Request based on the Allowed_Supply associated with the printer for which the Order_Request is requesting supplies.

The supply control module 144 includes a series of programmable instructions capable of being executed by processor 142. The series of programmable instructions can be stored on a computer-readable medium, such as RAM, a hard drive, CD, smart card, 3.5" diskette, etc., or transmitted via propagated signals for being executed by the processor 142 for performing the functions disclosed herein and to achieve a technical effect in accordance with the disclosure.

The processor 142 includes or accesses at least one data storage device which stores data associated with each printer device 120 that is transmitting Printer_Usage data to the device manager 130.

Figure 2:
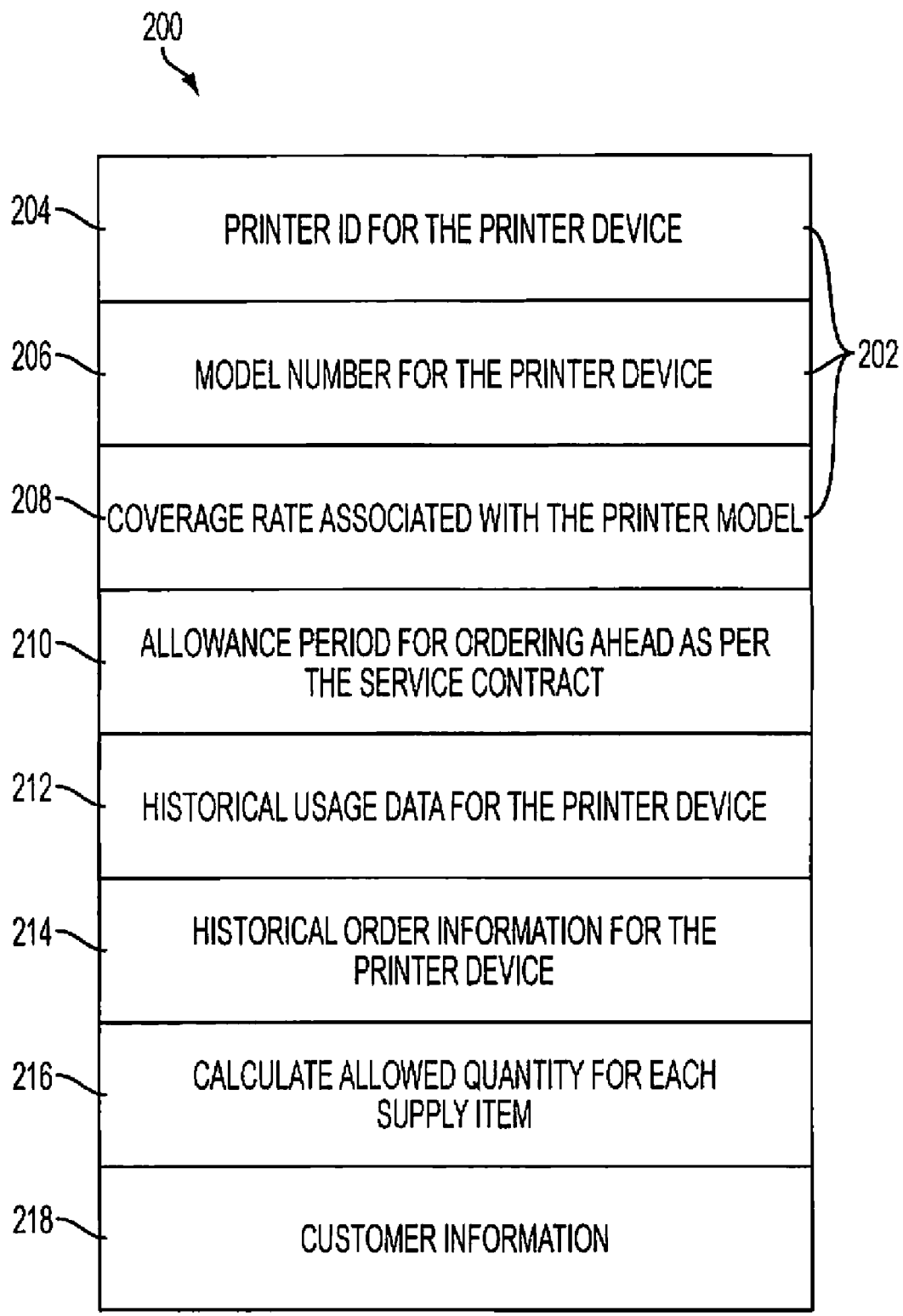
FIG. 2 is a schematic diagram of a data record of the one or more color toners stored by the supply control system shown in FIG. 1, in accordance with the present disclosure.

Referring to FIG. 2, a schematic diagram of a data record of the one or more color toners stored by the supply control system shown in FIG. 1 is presented, in accordance with the present disclosure. A database 200 storing exemplary data records 202 stored by the storage device are shown in FIG. 2, with each data record 202 storing data associated with a particular printer device 120 in a plurality of fields.

The plurality of fields includes a field 204 storing a Printer ID identifying the printer device 120, a field 206 storing a model number for the printer device 120, and a field 208 storing coverage rate associated with the printer model for at least one supply item covered by the service contract. The coverage data may include separate coverage data for the various toners used, which for a color printer may include black, red, cyan and magenta. The coverage data may be based on industry information known for the particular printer device model, or may be set at different levels than industry standards, such as defined by the service contract terms or program procedures.

The plurality of fields further includes a field 210 storing an allowance period, which is a service contract term describing a time interval for which the customer can order in advance a supply item, a field 212 storing historical usage data (e.g., stored in impressions (black and color impressions may be stored separately) indicating consumption of at least one supply for the printer device 120, a field 214 storing historical order information for the printer device 120, a field 216 storing Allowed_Supply, a calculated allowed quantity for each supply item, and a field 218 storing customer information, such as shipping address and billing information.

The disclosure is not limited to the exemplary configuration of data storage shown in FIG. 2. For example, the coverage data may be stored in a separate coverage data database accessible by the processor 142 which stores coverage data for various supply items for a variety of printer models.

The services manager 140 communicates with at least one customer station 110 and the services manager 130 via its communication device(s) 146. The services manager 140 may be part of one or more networks, such as a LAN, WAN, intranet or the Internet which facilitates communication between the services manager 140 and the customer station(s) 110 and between the services manager 140 and the device manager 130. Different networks may be used by the services manager 140 for communicating with the customer station(s) 110 and the device manager 130. The at least one communication device 146 provides communication between the processor 142 and the at least one network. The at least one communication device 146 includes, for example, a modem, router and/or Ethernet port.

The supply control module 144 stores Printer_Usage data as it is received from a particular printer device 120 in the field 212 of a data record 200 associated with the printer device 120. In the present example, the Printer_Usage data is stored in terms of impressions with an associated date indicating the date that the meter module 124 transmitted the data to the device manager 130. Since Printer_Usage data is stored upon receipt, the data stored may include current updated Printer_Usage data.

The supply control module 144 updates the Allowed_Supply quantity for each supply item for each printer device 120 or a particular printer device 120 such as at regular intervals and/or upon the occurrence of an event. Events include, for example, receipt of an Order_Request associated with a particular printer device 120, receipt of Printer_Usage data for a particular printer device 120, and/or an update to service contract terms for a particular printer device 120.

In particular, in accordance with the exemplary embodiments of the present disclosure, the printer usage data relates to color data, such as color usage data. Each printer device 120 can include different color toner requirements based on usage and the service contract.

Figure 3:
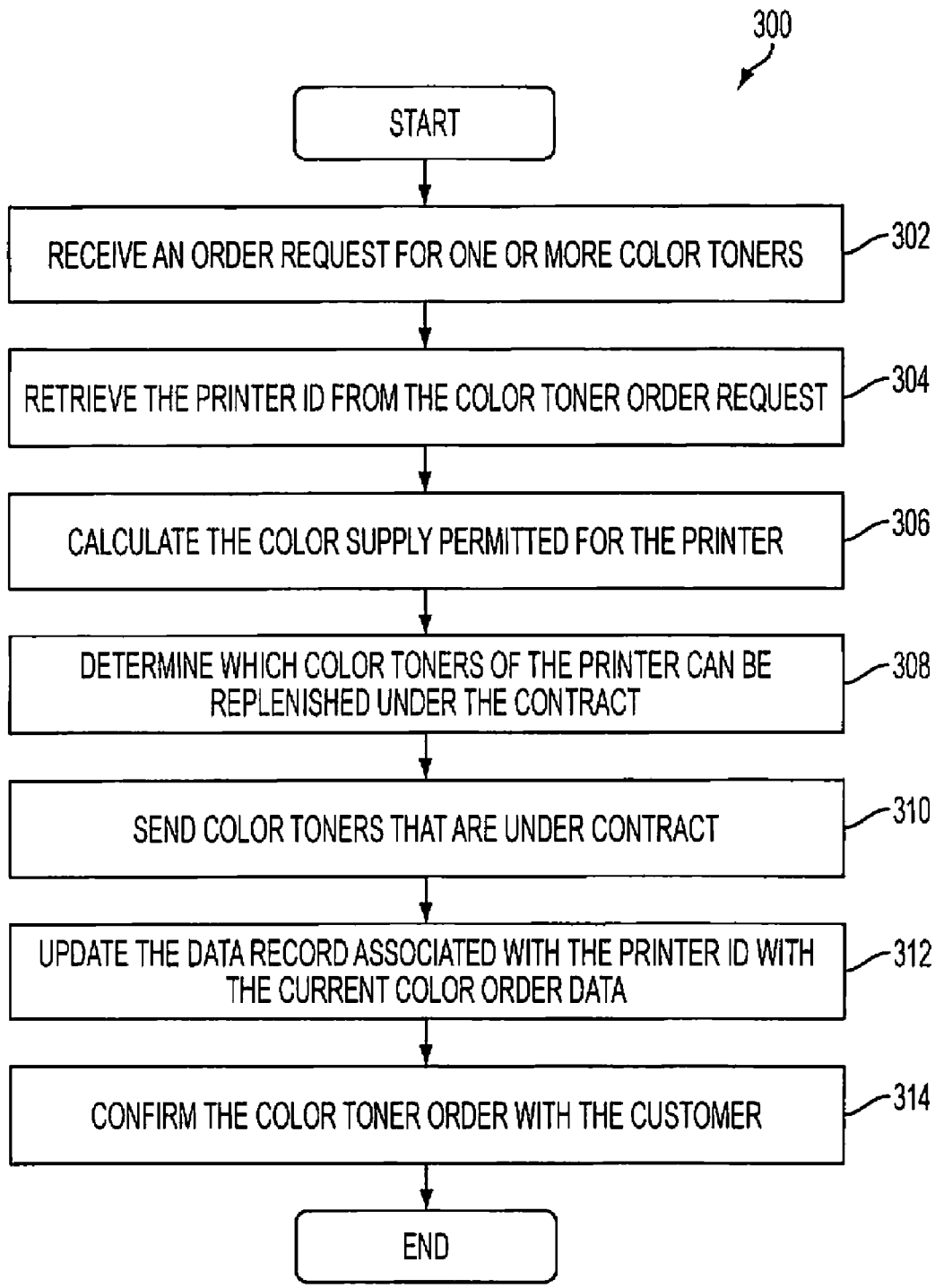
FIG. 3 is a flowchart showing an operation for ordering one or more color toners executed by a supply control module of the supply control system shown in FIG. 1, in accordance with the present disclosure.

FIG. 3 is a flowchart showing an operation for ordering one or more color toners executed by a supply control module of the supply control system shown in FIG. 1, in accordance with the present disclosure. FIG. 3 shows a flowchart 300 showing operation of the supply control module 144 upon receipt of an Order_Request.

At step 302, the supply control module 144 receives an order request for one or more color toners. At step 304, the supply control module 144 retrieves the Printer ID from the from the color toner order request. At step 306, the supply control module 144 accesses the data record 200 which is associated with the Printer ID and calculates the color supply quantity requested in accordance with an algorithm described below. At step 308, the supply control module 144 determines which color toners of the printer making the request can be replenished under the contract. At step 310, the company sends color toners that are under contract. At step 312, the supply control module 144 proceeds to update the record 200 associated with the associated printer device 120 with the current order data, such as by updating the historical order data field 214 with the current date, the supply item ordered, and the quantity ordered. At step 314, the order is confirmed with the customer, such as by requesting that the customer confirm information, such as the Printer ID, printer model, color toner, quantity ordered, billing data, and shipping address.

Confirmation of the order may be performed by sending a Confirmation_Request to the customer portal module 114. The customer portal module 114 displays the information to be confirmed to the user of the customer station 110 and requests that the user enter a confirmation entry via the GUI, which is sent to the supply control module 144, completing the confirmation process.

An exemplary algorithm for determining the permissible color toner for a particular printer device 200 is shown below. The disclosure is not limited to the exemplary algorithm.

Enhanced Threshold Supply Control Formula: Allowed Supply Items Quantity=((Maximum Allowed Inventory−(Pages Covered in Usage Period−Total Usage))/Toner Yield Adjusted for Coverage Level+Cost Item Allowance, where:

Allowed Supply Items Quantity: (modified after the original submission) is quantity of all requested items, regardless of SKU.

Maximum Allowed Inventory: is Average monthly print volume multiplied by the number of months that the inventory can cover in the future, i.e., if ordering in advance, how many months of inventory can be ordered.

Pages Covered in Usage Period: is number of pages printed since from the first known meter read date to most recent meter read date.

Toner Yield Adjusted for Coverage Level: (modified after the original submission) is equal to (Toner Rated Life/Device-specific coverage) Toner rated coverage percentage.

Device-specific coverage should equal to the total coverage of CYM. So, if at the device level, Cyan Coverage=4, Yellow Coverage=5, Magenta Coverage=6, then total Device Coverage shall equal 15%.

Toner rated coverage percentage shall be the average of the CYM rated coverage. So, if at the toner level, Cyan Coverage=4, Yellow Coverage=5, Magenta Coverage=6, then Toner rated coverage shall equal 5%.

Toner rated life shall be the average of the CYM rated lives. So, if at the toner level, Cyan Rated Life=9000, Yellow Rated Life=10,000, Magenta Rated Life=11,000, then Toner rated life shall equal 10,000.

Cost Item Allowance: is number of items needed to cover the volume for the amount of time that the customer is allowed to pre-order for. This is customized per customer account based on business rules. For example: if set to 2 months and monthly volume is 20K impressions, customer would be allowed to order enough extra supplies to cover 40K impressions. If Cyan toner yield is 20K at 5% coverage and the cyan coverage on the device is at 5%, Cost Item Allowance would equal to 2 ((2*20K)/20K).

If the customer request exceeds the allowed supply items quantity, the order is rejected. Otherwise the order is accepted.

Criteria for determining that the algorithm for determining whether Allowed_Supply should be adjusted may include, for example, where there is a change in the expected type of printing jobs that are being executed by the printer device 120, or where the workflow of the printer device 120 is seasonal (e.g., tax season for an accounting firm). The adjustments may include, for example, changing the Coverage Rate and/or extending the Allowance Period. Another adjustment may be made to the consumable yield if, for example, historical data or manufacturer data indicates a change from the original specification.

In summary, the supply control system 100 provides for tracking printer device usage including color toner consumption. The printer device usage tracking is transparent to the customer. The services manager 140 serves as a repository for the tracked information and industry information, such as known toner yield. The services manager 140 monitors the usage and ordering behavior associated with a plurality of printer devices 120 and then applies the monitored behaviors and industrial information using a formula for controlling customer ordering of color toner for the printer devices 120.

In conclusion, the present disclosure proposes a process to reduce the amount of supplies that are reordered for accounts where unlimited supplies are included in the contract price. Over-ordering reduces profits and at the same time a company does not want to inhibit the customer from ordering supplies that are legitimately used. The present disclosure addresses the issue of exhaustion of one toner color triggering a re-order event for a complete set of color toners. When this happens the customer is left with un-needed toner. The suggested algorithm enables the customer to order more of the colors they use and less of the colors they do not while maintaining their ordering quotas. This algorithm is designed to allow the customer to order more of the toner color they need without incurring additional expenses to the company.

The present disclosure also includes as an additional embodiment a computer-readable medium which stores programmable instructions configured for being executed by at least one processor for performing the methods described herein according to the present disclosure. The computer-readable medium can include flash memory, CD-ROM, a hard drive, etc.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, or a combination thereof.

The invention claimed is:

1. A supply control system for managing customer color orders associated with at least one printer device, the supply control system comprising:
   a processor; and
   a supply control module including a series of programmable instructions executable by the processor for:
      receiving color usage data from the at least one printer device indicative of consumption of one or more of a plurality of color toners;
      calculating for each printer device of the at least one printer device a permissible amount of each color toner of the plurality of color toners that can be ordered for the printer device by a customer based on a contract; and
      receiving a customer color order request for selectively ordering an amount of one or more color toners of the plurality of color toners for a printer device of the at least one printer device under the contract;
   wherein the supply control module limits the requested customer color order which can be ordered when the requested amount exceeds a permissible amount calculated for each color toner of the plurality of color toners for the printer device.

2. The supply control system according to claim 1, wherein the color usage data for a printer device of the at least one printer device indicates a quantity of units of color printing executed by the customer of the printer device.

3. The supply control system according to claim 1, wherein the calculation of the permissible amount is further based on an allowance period which is a predetermined time interval for which the customer is permitted to order at least one color toner of the plurality of color toners in advance.

4. The supply control system according to claim 1, wherein:
   the calculation of the permissible amount is further based on an allowance period which is a predetermined time interval for which the customer is permitted to order the at least one color toner of the plurality of color toners in advance; and
   the calculation is adjustable upon request by adjusting at least one of a coverage rate data and the allowance period.

5. The supply control system according to claim 1, wherein:
   the supply control module further comprises programmable instructions for revising the customer color order request and submitting a revised customer color order request to the customer for confirmation when it is determined that the requested amount exceeds the permissible amount; and
   the supply control module further comprises programmable instructions for processing the customer color order request for filling of the order when one of:
      it is determined that the requested amount does not exceed the permissible amount; and
      confirmation of the revised order request is received from the customer.

6. The supply control system according to claim 1, wherein the calculation of the permissible amount is further based on at least one previously received customer color order request associated with each color toner of the plurality of color toners of the printer device.

7. The supply control system according to claim 1, wherein the supply control module uses a predefined formula to manage the customer color orders, the predefined formula dependent on: maximum allowed inventory, pages covered in a usage period, actual usage, cost of supplies, and toner yield adjusted for coverage levels.

8. The supply control system according to claim 7, wherein the toner yield adjusted for coverage levels is dependent on: toner rated life, device-specific coverage, and toner rated coverage percentage.

9. A method for managing customer color orders associated with at least one printer device, the method comprising:
receiving color usage data from the at least one printer device indicative of consumption of one or more of a plurality of color toners;
calculating for each printer device of the at least one printer device a permissible amount of each color toner of the plurality of color toners that can be ordered for the printer device by a customer based on a contract; and
receiving a customer color order request for selectively ordering an amount of one or more color toners of the plurality of color toners for a printer device of the at least one printer device under the contract;
wherein the supply control module limits the requested customer color order which can be ordered when the requested amount exceeds a permissible amount calculated for each color toner of the plurality of color toners for the printer device.

10. The method according to claim 9, wherein the color usage data for a printer device of the at least one printer device indicates a quantity of units of color printing executed by the customer of the printer device.

11. The method according to claim 9, wherein the calculation of the permissible amount is further based on an allowance period which is a predetermined time interval for which the customer is permitted to order at least one color toner of the plurality of color toners in advance.

12. The method according to claim 9, wherein:
the calculation of the permissible amount is further based on an allowance period which is a predetermined time interval for which the customer is permitted to order the at least one color toner of the plurality of color toners in advance; and
the calculation is adjustable upon request by adjusting at least one of a coverage rate data and the allowance period.

13. The method according to claim 9, wherein:
the supply control module further comprises programmable instructions for revising the customer color order request and submitting a revised customer color order request to the customer for confirmation when it is determined that the requested amount exceeds the permissible amount; and
the supply control module further comprises programmable instructions for processing the customer color order request for filling of the order when one of:
it is determined that the requested amount does not exceed the permissible amount; and
confirmation of the revised order request is received from the customer.

14. The method according to claim 9, wherein the calculation of the permissible amount is further based on at least one previously received customer color order request associated with each color toner of the plurality of color toners of the printer device.

15. The method according to claim 9, wherein the supply control module uses a predefined formula to manage the customer color orders, the predefined formula dependent on: maximum allowed inventory, pages covered in a usage period, actual usage, cost of supplies, and toner yield adjusted for coverage levels.

16. The method according to claim 15, wherein the toner yield adjusted for coverage levels is dependent on: toner rated life, device-specific coverage, and toner rated coverage percentage.

17. A computer-readable medium storing a series of programmable instructions configured for execution by at least one processor for performing a method of managing customer color orders, the method comprising:
receiving color usage data from the at least one printer device indicative of consumption of one or more of a plurality of color toners;
calculating for each printer device of the at least one printer device a permissible amount of each color toner of the plurality of color toners that can be ordered for the printer device by a customer based on a contract; and
receiving a customer color order request for selectively ordering an amount of one or more color toners of the plurality of color toners for a printer device of the at least one printer device under the contract;
wherein the supply control module limits the requested customer color order which can be ordered when the requested amount exceeds a permissible amount calculated for each color toner of the plurality of color toners for the printer device.

18. The computer-readable medium according to claim 17, wherein the color usage data for a printer device of the at least one printer device indicates a quantity of units of color printing executed by the customer of the printer device.

19. The computer-readable medium according to claim 17, wherein the calculation of the permissible amount is further based on an allowance period which is a predetermined time interval for which the customer is permitted to order at least one color toner of the plurality of color toners in advance.

20. The computer-readable medium according to claim 17, wherein:
the calculation of the permissible amount is further based on an allowance period which is a predetermined time interval for which the customer is permitted to order the at least one color toner of the plurality of color toners in advance; and
the calculation is adjustable upon request by adjusting at least one of a coverage rate data and the allowance period.

21. The computer-readable medium according to claim 17, wherein the calculation of the permissible amount is further based on at least one previously received customer color order request associated with each color toner of the plurality of color toners of the printer device.

22. The computer-readable medium according to claim 17, wherein the supply control module uses a predefined formula to manage the customer color orders, the predefined formula dependent on: maximum allowed inventory, pages covered in a usage period, actual usage, cost of supplies, and toner yield adjusted for coverage levels.

23. The computer-readable medium according to claim 22, wherein the toner yield adjusted for coverage levels is dependent on: toner rated life, device-specific coverage, and toner rated coverage percentage.

* * * * *